United States Patent Office 3,353,639
Patented Nov. 21, 1967

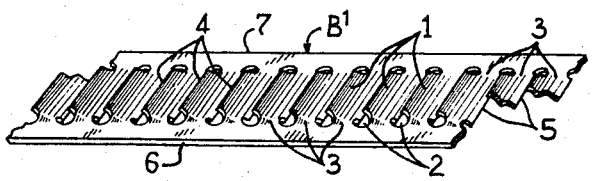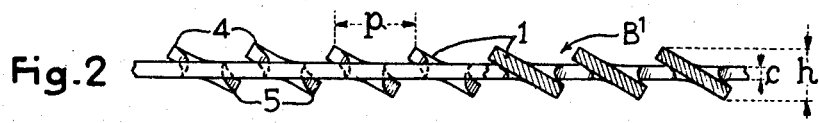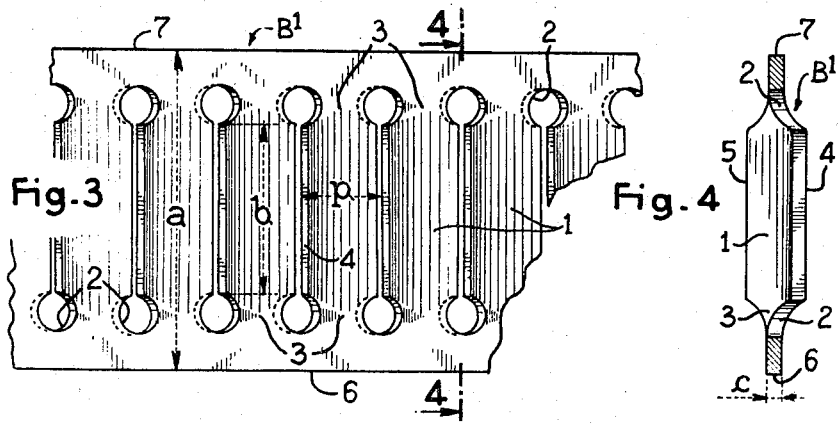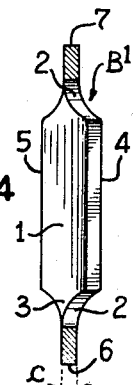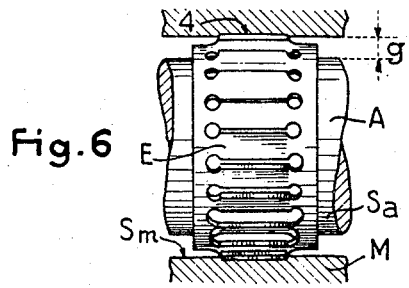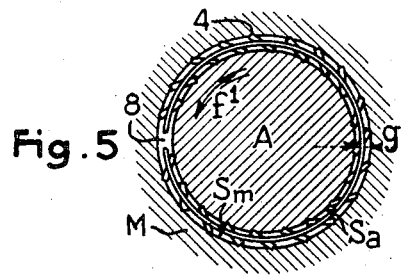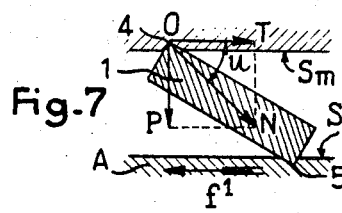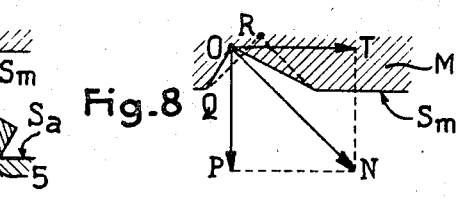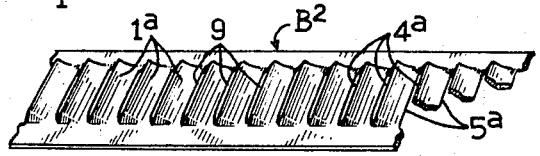

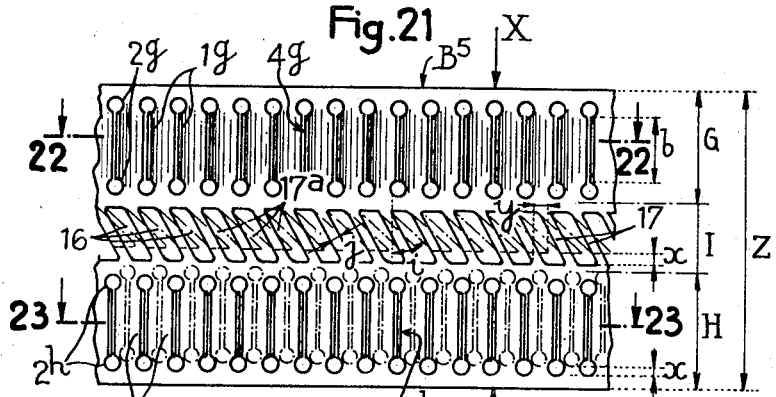
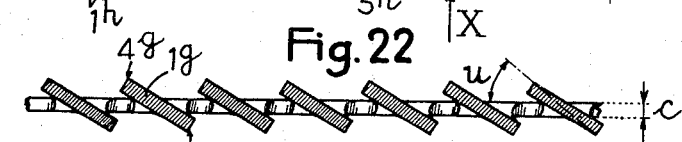
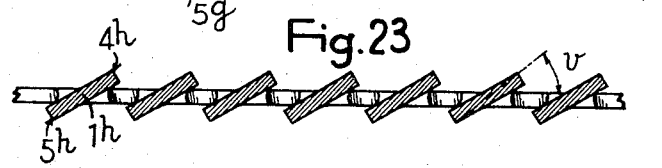
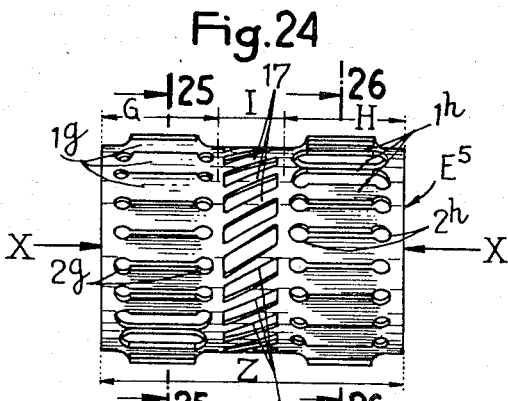
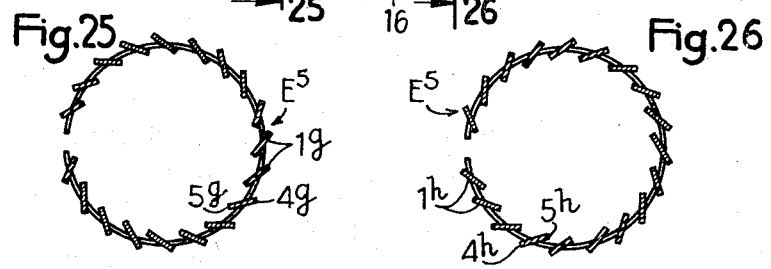

3,353,639
STRIP PROVIDING COUPLING ELEMENTS COUPLING, WITH REGARD TO ROTATION, TWO CONCENTRIC MEMBERS, THE ELEMENTS OBTAINED FROM SAID STRIP AND ASSEMBLIES EMPLOYING SAID ELEMENT
François Andriussi, Saint-Martin d'Heres, France, assignor to Peugeot et Cie Societe Anonyme, Audincourt, Doubs, France, and Eurotechni Office Europeen d'Etudes et de Realisations Techniques, Grenoble, Isere, France, both corporations of France
Filed June 15, 1965, Ser. No. 464,082
Claims priority, application France, June 17, 1964, 978,578; June 9, 1965, 19,980
14 Claims. (Cl. 192—41)

ABSTRACT OF THE DISCLOSURE

A strip for coupling two members having concentric cylindrical surfaces, said strip consisting of a resiliently bendable material and comprising a row of pairs of tab portions, each of which tab portions is contained in an inclined plane intersecting the general plane of the strip, the tab portions of each pair being symmetrical relative to the line of intersection of said general plane and said inclined plane and constituting two projections one of which projects from one face of the strip whereas the other projects from the other face of the strip, said projections having sharp edges for engaging said cylindrical surfaces and being resiliently yieldable upon application of a force thereon in a direction perpendicular to said general plane.

---

The present invention relates to the mechanical rotary coupling between two elements having concentric cylindrical surfaces, for example between a shaft and the hub of a fly-wheel or other member mounted on said shaft.

Conventionally, a connection or coupling between such members is achieved by an interference fit, keying or without mechanical contact.

The coupling employing an interference fit utilizes all assembling means involving a radial pressure-applying force which creates, owing to the coefficient of friction of the contacting materials, a coupling force between the two surfaces in contact. So long as the shear stress which could be created between the two surfaces does not exceed the coupling force there is a rigid coupling. In order to obtain a radial pressure-applying force there is usually employed a hooping or force fit or a fit between conical surfaces with application of an axial force. This type of assembly is very good but requires very high machining precision associated with an important amount of assembling and disassembling means. The coefficient of friction, which is usually low in respect of materials employed in the mechanical engineering industry, requires very high radial pressures which often results in deformation and sometimes rupture of one of the members. The coupling by means of an interference fit can also be obtained by means of a screw exerting a radial pressure in which case the assembly is cheap to achieve but has a vey low force-transmitting capacity.

The couplings obtained by keying have the drawback of localizing the coupling forces, and the load capacity is low when only one key exists. The construction is costly and it is difficult to obtain an assembly without play.

Couplings without mechanical contact are usually ensured by a fluid or magnetic drive and are employed in special circumstances unusual in current mechanical engineering practice.

Briefly, known connecting or coupling means are either expensive to construct or limited in their load-transmitting capacity.

The object of the present invention is to remedy all these drawbacks in a very simple manner.

The invention provides, as a new industrial product, a strip capable of providing, by the cropping and bending of cropped sections thereof, coupling elements affording a coupling with regard to rotary motion, between two members having concentric cylindrical surfaces, said strip being of low cost price and said elements being easy to mount and having a high force-transmitting capacity for a given overall size owing to the multiple coupling points it affords. Said strip is composed of a resiliently bendable material and comprises tabs which are cut out and deformed in a permanent manner so as to constitute, on both faces of the strip, projections, the projections on both faces being symmetrical and having sharp edges.

Another object of the invention is to provide an element for coupling, with regard to rotary motion, two members having concentric cylindrical surfaces, said element being a split ring obtained by the simple bending of a section of the aforementioned strip.

A further object of the invention is to provide a mechanical assembly comprising two members having concentric cylindrical surfaces defining therebetween a gap, said two members being coupled by at least one split ring of the aforementioned type, the material of which the ring is composed being harder than that of said members and the radial extent of said gap being between the thickness of the strip and the radial distance between concentric planes containing the outer and inner edges of the ring, whereby said edges penetrate said surfaces and thus afford a multiple keying therebetween.

As will be understood, the ring is easy to construct and to engage, by an axial thrust, between the two concentric cylindrical surfaces, the projections of the strip deforming resiliently upon assembly and each of them thereafter exerting a force against the adjacent surface of one of said members to be coupled and slightly penetrating said surface in assuming roughly the initial inclination it was given by construction.

Owing to the symmetry of the projections and to their sharp edges, the anchoring or coupling between the two members to be coupled is achieved by the projections alone without need for a special machining of these members.

Further features and advantages of the invention will be apparent from the ensuing description with reference to the accompanying drawings to which the invention is in no way limited.

In the drawings:
FIG. 1 is a perspective view of a portion of a strip according to the invention;
FIG. 2 is a partial side elevational view and a partial longitudinal sectional view of said strip;
FIG. 3 is a plan view thereof on an enlarged scale;
FIG. 4 is a cross-sectional view taken along line 4—4 of FIG. 3;
FIG. 5 is an end elevational view of a split ring for interconnecting or coupling two members, with regard to relative rotation therebetween, said ring being obtained from a section of the strip shown in FIG. 1 and interposed between said two members;
FIG. 6 is a side elevational view of said ring, the outer member being shown in section;
FIG. 7 is a diagram showing the penetration of two consecutive projections of the strip in the opposed faces of the members;
FIG. 8 is a diagram on an enlarged scale of the forces involved and the shape of the penetration cavity in the outer member;

FIGS. 9 and 10 are perspective views of portions of two variants of the strip;

FIG. 21 is a front elevational view of a portion of another strip according to the invention having two rows of projections having inclinations which are reversed from one row to the other;

Figure 27:
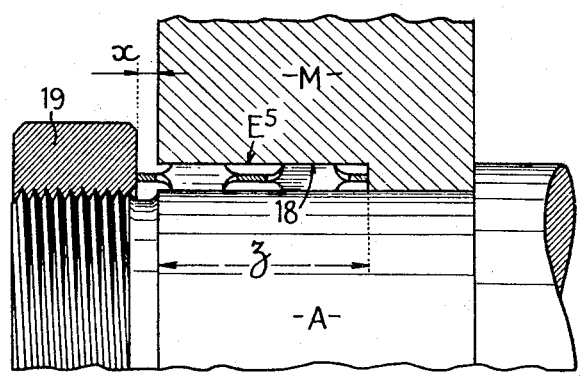
Figure 28:
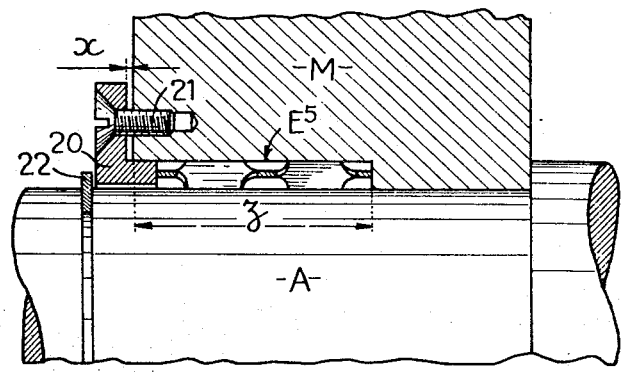
Figure 29:
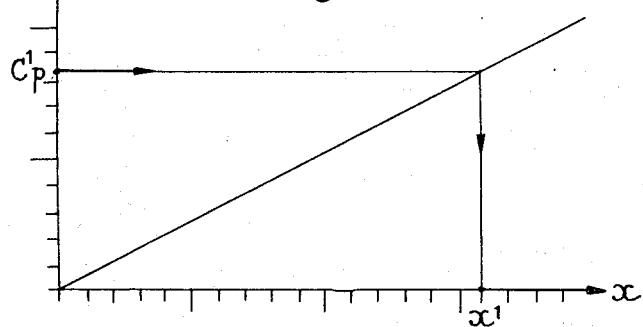

FIGS. 22 and 23 are longitudinal sectional views taken along lines 22—22 and 23—23 of FIG. 21;

FIG. 24 is an elevational view of the element in the form of an open ring or collar obtained by cropping off and bending a section of said strip;

FIGS. 25 and 26 are sectional views taken along line 25—25 and 26—26 of FIG. 24;

FIGS. 27 and 28 are axial radial sectional views of two assemblies according to the invention, and FIG. 29 is a diagram showing the stress torque as a function of the deformation of the resilient portions of the ring shown in FIGS. 24–26.

In the embodiment shown in FIGS. 1–4, the new industrial product according to the invention comprises a strip $B^1$ composed of a resiliently bendable material which is such as to be harder than the materials of the members between which a portion of said strip must be disposed, after it has been bent into the form of a split ring, so as to couple these members with regard to relative rotation therebetween.

This strip comprises a row of projections disposed alternately on each side of the strip. Said projections are constituted by inclined tab portions 1 forming parallel slats or tabs similar to those of a venetian blind and obtained by piercing lateral apertures 2, forming transverse slits and forming up or twisting the material constituting each tab portion in the portions 3 adjacent said apertures. Each inclined tab portion 1 forms therefore on each face of the strip a projection with a sharp edge 4 or 5. In the presently-described embodiment, the projections are transversal, that is perpendicular to the longitudinal edges 6 and 7 of the strip.

Generally, said strip is of very hard steel and has a very high elastic limit since it must be capable of becoming slightly embedded in the surfaces to be interconnected or coupled. Steels employed in the construction of springs are particularly suitable, for example, a steel having a 0.75% carbon content which is highly work-hardened or subjected to a hardening treatment and tempered.

For certain applications, a material having good rust resistance would be employed, for example the following could be employed:

(a) A hardened stainless steel (for example a steel having 13% chromium and 0.4% carbon).

(b) A nickel-chromium stainless steel (for example, cold-rolled 18–8 steel).

(c) Rolled bronze for springs (for example, a bronze containing 7–9% tin and 0.3% of phosphorus whose elastic limit is 30–40 $h$ bars and whose elongation exceeds 25%).

In the case of the coupling of members composed of a soft material, for example synthetic plastics material, the material of the strip $B^1$ could have a modulus of elasticity which is lower than steel and bronze, for example it could be a light alloy in particular basically aluminium (for example, of the type AU 4G); a laminated sheet constructed from kraft paper, textile fabric, glass fabric impregnated with hard synthetic resin, for example a polyester or a melamine.

The dimensions of the strip and the various parts thereof are generally not critical. A rapid research of the possible commercial market for this strip showed that practically all the contemplated applications could be satisfied with a relatively small number of types and in particular the three types I, II and III in respect of which the following table gives the contemplated dimensions (it being understood, however, that no restriction of the scope of the invention is intended thereby) in the case of a carbon steel treated so as to possess an elastic limit $Re = 100h$ bars. In this table:

$a$ = width of the strip
$b$ = length of the projections
$c$ = thickness of the strip
$p$ = pitch of the projections (equal to the spacing between the slits from which they result)
$C_s$ = safety load in newtons/cm.

|  | I | II | III |
|---|---|---|---|
| a (mm.) | 20 | 10 | 4 |
| b (mm.) | 10 | 5 | 2 |
| c (mH.) | 1 | 0.5 | 0.2 |
| p (Hm.) | 5 | 2.5 | 1 |
| C$_s$(N/cm.) | 500 | 250 | 100 |

With reference to FIGS. 5 and 6 which represent a keying obtained between a shaft A having an outer cylindrical surface $Sa$ and a machine part or member having a hub M whose inner surface $Sm$ is concentric with said shaft and with its outer surface. These surfaces $Sa$ and $Sm$ have different diameters so as to form therebetween a radial gap whose radial extent $g$ is between the thickness $e$ of the undeformed strip and the distance $h$ from one edge 4 to the following edge 5.

In order to couple or interconnect, with regard to relative rotation, the members A and M, a portion is cut from the strip $B^1$ which has a length very slightly less than the length of the means circumference of the gap of radial extent $g$. This portion is bent into the form of an annular element E which is open at 8 (FIG. 5). This element is thereafter interposed between the surfaces $Sm$ and $Sa$ by exerting an axial pressure on the element so that the projections 1 are resiliently deformed in that they are slightly pressed back toward the faces of the portion of the strip. However, these projections can form more or less a path in the softer material of the members A and M in the form of small longitudinal grooves which initiate the penetration of the edges 4 and 5 in the surfaces $Sa$ and $Sm$.

Indeed, these projections exert a resilient force on the surfaces and, when the shaft or hub M is driven in the direction of arrow $f^1$ (FIGS. 5 and 6), it drives the hub M (or shaft A) in the same direction, first by the effect of friction, this friction rapidly turning into an insertion owing to the slight penetration of the teeth or edges 4, 5 in the surfaces $Sa$ and $Sm$ if they had not already penetrated therein when fitting the two parts together. Consequently, almost immediately the frictional connection becomes a true rigid connection by means of an infinite number of keys, since there are per centimetres of circumferential surface: 2 keys in respect of the type I, 4 keys in respect of the type II, and 10 keys in respect of the type III.

FIG. 7 shows the position finally assumed by a tooth 1 having two projections. In this FIG. 7, the various connection forces have been shown. If OT corresponds to the tangential driving force in respect of one tooth, and $x$ is the angle corresponding to the inclination of the tooth, there is obtained:

normal force $OP = OT \tan u$
and the resultant $$ON = \frac{OT}{\cos u}$$

It is clear from the FIG. 8 that this resultant acts on the part M and in fact on the surface corresponding to the line QR perpendicular to ON. It is easy to calculate knowing ON and the elastic limit of the material of the part M.

It will be observed moreover, that each tooth 1 acts like a stay and is, under the action of the resultant ON, subjected to compressive stress. It is sufficient that the teeth 1 resist buckling to transmit the driving torque. To achieve this it is merely necessary to satisfy Euler's well-known law:

$$e > \frac{p}{12.5}$$

namely $$e > \frac{5}{12.5}$$

in respect of the type I, which is true since $e = 1$ mm.

It is easy to see that the same is true of the types II and III.

As concerns the load capacity of a given strip, it depends on its width $a$, its thickness $c$, the pitch $p$ of the projections, the profile of the projections (effective length $b$ of each tooth relative to the total width $a$) and the nature of the material of which the strip is composed.

For example, with two teeth per centimetre of length of strip and in respect of a safety load capacity $C_s$ of 500 N/cm., the load corresponds to a compressive stress equal to $500/2s$, $s$ being the cross-section of a tooth. In the case of type I, $s = b \times c = 10 \times 1 = 10$ sq. mm. and the compressive stress is $$\frac{500}{2 \times 10} = 25 \text{ N/sq. mm.}$$

namely about 2.5 $h$ bars; this is very low relative to the elastic limit.

Bearing in mind the foregoing considerations, the user who wishes to employ such keying elements would calculate from the torque to transmit and the size of the shaft the tangential force per unit length of circumference. He would then determine the number of elements required for the keying.

*Example I.*—It is necessary to achieve a coupling on a shaft of 80 mm. diameter for transmitting a torque of 1,200 N.m.

The tangential force is $$F_t = \frac{1200}{0.04} = 30{,}000 \text{ N}$$

The tangential force expressed in units of length of circumference is:

$$t = \frac{30{,}000}{\pi \times 8} = 1{,}200 \text{ N/cm.}$$

There are consequently required:

$$\frac{1{,}200}{500} = 2.4$$

strips, say three standard strips of type I placed in side by side relation.

*Example II.*—A shaft of 16 mm. diameter must transmit a torque of $C = 12$ N.m.

$$F_t = \frac{12{,}000}{8} = 1{,}500 \text{ N}$$

$$t = \frac{1{,}500}{\pi \times 1.6} = 298 \text{ N/cm.}$$

There are therefore required:

either $$\frac{298}{250} = 1.20 \text{ strips}$$

namely two strips of type II or $$\frac{298}{100} = 3 \text{ strips}$$

namely three strips of type III.

Some variants of the strip will now be described.

In the embodiment shown in FIG. 9, the projection $1^a$ of the strip $B^2$ are obtained by a simple lancing or louvering operation. The manufacture is a little simpler but the ends at which the edges $4^a$, $5^a$ are connected to the rest of the strip do not taken part in the keying.

Figure 10:
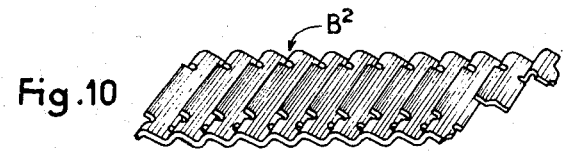
Figure 11:
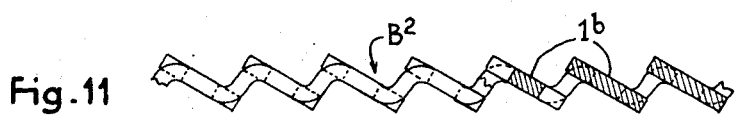
FIG. 11 is a view, partly in section and partly in side elevation, of the strip shown in FIG. 10.
Figure 12:
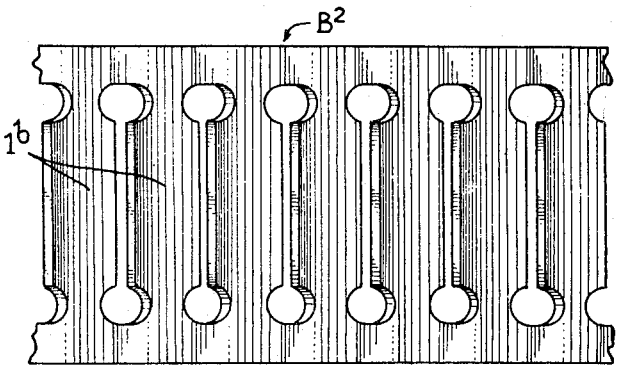
FIG. 12 is a plan view on an enlarged scale of the strip shown in FIG. 10.

In the variant shown in FIGS. 10–12, the strip $B^2$ is corrugated and the generatrices of the corrugations extend transversely. In this arrangement, the connection of the oblique slats or tabs $1^b$ to the lateral portions of the strip is without twisting or bending up, and the slats $1^b$ are parallel to these lateral portions (compare FIGS. 2 and 11).

Figure 13:
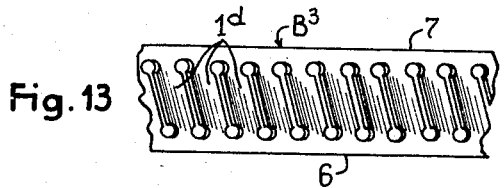
FIG. 13 is a plan view of a portion of another strip having oblique projections.
Figure 14:
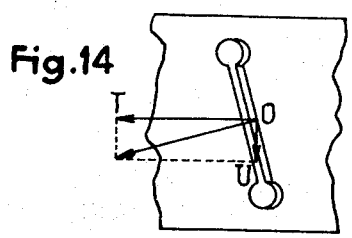
FIG. 14 is a diagram of the forces developed in the strip shown in FIG. 13.

FIG. 13 shows a strip $B^3$ of the first type but having teeth or tabs $1^d$ which are inclined relative to the edges 6 and 7 of the strip. Consequently, the tangential driving force OT (FIG. 14) results in an axial component OU which can be useful in certain applications for retaining one of the thus coupled members.

In all the foregoing embodiments, the tabs or other projections 1 to $1^d$ are all inclined in the same direction so that the keying elements is unidirectional in effect (acting in the direction of arrow $f^1$, FIG. 5).

Figure 15:
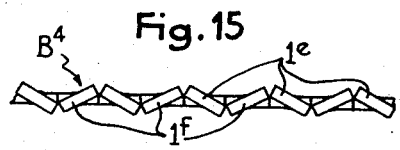
FIG. 15 is a longitudinal sectional view of another variant of the strip.

FIG. 15 shows a variant of the strip in which the tabs or teeth $1^e$ and $1^f$ are inclined alternately in opposite directions so that the anchoring is insured in either one of the two directions of rotation, which can consequently be adopted as the direction of rotation. Such a solution can naturally be adopted with any one of the foregoing embodiments. The tabs can also be grouped into pairs or more of tabs, all the tabs of one group being inclined in the same direction and this direction being reversed from one group to the other.

FIGS. 16–20 show assemblies obtained in accordance with the invention.

Figure 16:
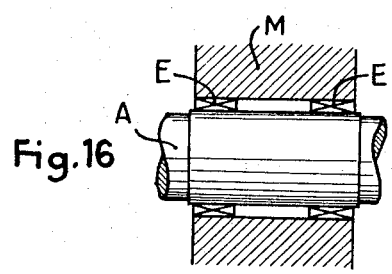
FIGS. 16–20 illustrate various arrangements of coupling devices achieving a coupling between two members, with regard to rotation, said devices being provided between the two members which have concentric cylindrical surfaces.

In FIG. 16 two devices E according to the invention are provided between the members A and M.

Figure 17:
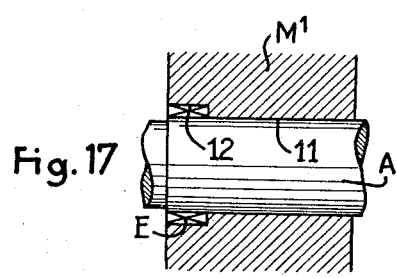

In the variant shown in FIG. 17, the member M bears on the shaft A through the medium of a smooth bearing surface 11 and only one device E is provided, disposed in a counterbore 12 in the part $M^1$.

Figure 18:
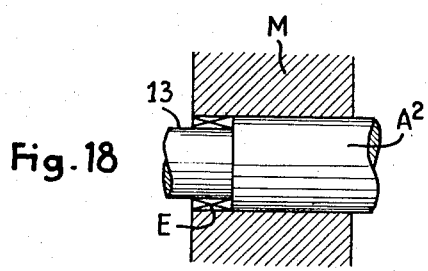
Figure 19:
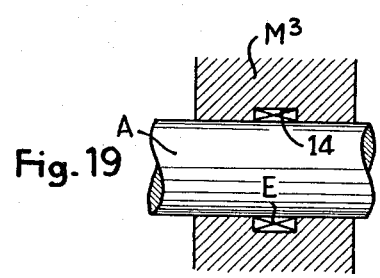
Figure 20:
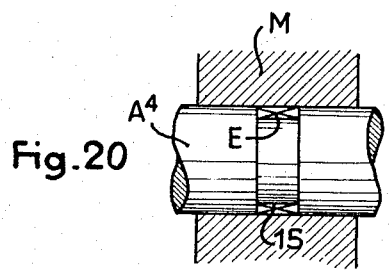

In the variant shown in FIG. 18, the element E is disposed on a reduced portion 13 of the shaft $A^2$. In FIG. 19 a middle element E is disposed in a groove 14 in the part $M^3$ and in FIG. 20 one element E disposed in a groove 15 in the shaft $A^4$.

It must be understood that these assemblies are not intended to limit the scope of the invention.

The element in the form of a split ring shown in FIG. 15 comprising slats or teeth having alternating inclinations, and that having a plurality of rows of projections having alternating inclinations simply cut from the same strip, can be employed for transmitting torque in either direction, but without it being possible, in operation, to reverse the direction of the torque. Contrary to what might be expected, such an element is generally unsuitable for the transmission of alternating torques, that is, a torque exerted successively in one direction and then in the other. Indeed, since the anchoring of the two members to be coupled with regard to rotation is obtained by the penetration of the teeth in the metal of said members, there is an angular displacement between these members as soon as the maximum torque is applied. This initial relative rotation is the greater as the applied torque is higher. Although generally it may not be great in the case of variable intensity torques in the same direction, in the case of torques in alternating directions this angular displacement could be double in respect of each reversal of the direction of the torque and this is unacceptable in respect of large torques.

The following embodiment is improved in such manner as to create a pre-stressing of the ring-shaped element so as to eliminate the initial angular play due to the penetration of the projections or teeth in the metal of the members coupled by the element.

This is obtained by means of a strip which is of the type described hereinbefore and comprises, in side by side relation, two parts each of which is provided with a row of portions which are cut and deformed in a permanent manner so as to constitute on both faces of the strip symmetrical projections having sharp edges, the projections having in each row the same inclination but the inclination of one of the rows being the reverse of that of the other row and the two parts of the strip being interconnected by resilient portions capable of undergoing a resilient pre-stressing deformation which tends to displace said parts longitudinally of each other.

With reference to FIGS. 21-23, the strip $B^5$ is composed of two lateral longitudinally extending parts G and H and a middle part I interconnecting the parts G and H. Each of a lateral part G and H is identical to the single strip shown in FIGS. 1-4. It comprises inclined portions $1^g$ or $1^h$ substantially forming parallel slats obtained by providing lateral apertures $2^g$ or $2^h$, forming transverse slits and twisting the material of each slat in the portions thereof adjacent the apertures. Each slat $1^g$ or $1^h$ has therefore two sharp edges $4^g$, $5^g$ or $4^h$, $5^h$.

The two parts G and H differ from each other in one respect. Their slats or tabs $1^g$ and $1^h$ have equal inclinations but in opposite direction (see the angles $u$ and $v$ in FIGS. 22 and 23). The slats $1^h$, $1^g$ (FIG. 22) being downwardly inclined from the left to the right whereas the inclination is opposite in respect of the slats $1^h$ (FIG. 23).

The same is true consequently of the element $E^5$ (FIGS. 24, 25, 26) in the form of a split ring or collar obtained by bending a section of said strip.

The central part I is provided with parallel and inclined openings 16 forming therebetween solid tabs or slats 17, which preferably terminate on the transverse axis of the plane and solid portions between the slats $1^g$ and $1^h$.

These tabs 17 are capable of a resilient deformation more or less in their plane so as to move from the position shown in full line in FIG. 21 to the position in dot-dash line $17^a$ when two transverse thrusts X (FIG. 21) are exerted on the strip or two equivalent thrusts are exerted on the ring $E^5$ (FIG. 24). If these thrusts result in a decrease $x$ in the width of the strip one of the ends of each tab 17 moves in the longitudinal direction to the extent $i$ relative to the other, or in other words, the part H of the strip is longitudinally offset to this extent $i$ relative to the other part G, and in the element $E^5$ the part H turns to the same extent relative to the part G.

If this relative rotation is created when the element $E^5$ is disposed in its housing between a shaft A and a hub M (FIGS. 27 and 28), the shifting of the teeth is accompanied by a penetration in the materials of the shaft and hub.

To obtain this axial compression force, it could be arranged, for example, that the width $z$ of the housing or recess 18 be smaller than the overall width $Z$ of the complete element. In this case (FIG. 27) a nut 19 positioning and retaining the hub permits compressing the ring an amount $x$ as shown.

In another embodiment (FIG. 28), a shouldered washer 20 is provided which, by the action of a screw 21, compresses the element $E^5$ even if the retaining means on the shaft (in the presently-described embodiment a split ring 22) is not designed to exert a force or create a displacement.

It must be understood that these examples of assembly are not intended to limit the scope of the invention:

The characteristics and the shape of the element in the form of a split ring would always be determined by the constructor of the ring who should give the user the necessary instructions for the mounting thereof.

This will be made clearer from the following numerical example:

| | Mm. |
|---|---|
| Thickness $c$ of the strip | 0.7 |
| Effective length $b$ of each tooth | 5 |
| Overall width of a single ring G or H | 10 |
| Width of the space I separating the two single rings | 2.5 |

An element $E^5$ was obtained from a strip of steel tape having one inclined tab or slat 17 per tooth.

Results of tests showed that in respect of elements in the form of a split ring defined hereinbefore, a tangential force is transmitted in respect of each tooth of 250 N with an offset of 0.05 mm.

These values will be taken for defining the deformation and the stress in each tab.

The calculation of the various stresses to which a tab is subjected shows that in respect of the selected example, the optimum dimensions of the tab are the following:

| | |
|---|---|
| Angle of inclination $i$, degrees | 30 |
| Width $j$ of the tab, mm. | 0.5 |

Under these conditions, in order to obtain a pre-stressing of 250 N per tooth, an axial force of about 125 N per tooth is exerted so as to produce the desired offsetting, namely 0.05 mm. The two parts G and H are moved toward each other a distance 0.087 mm.

The maximum stress in a tab is 176 $h$ bars (176 kg./sq. mm.) which is acceptable for steels normally employed in the construction of the rings. If the material does not allow such stresses, longer tabs will be provided. Consequently, the width of the space I between the two parts G and H is increased.

The user will be informed in the following manner.

Given an element in the form of a ring of the type defined hereinbefore provided for a shaft of 20 mm. diameter and having 25 teeth.

The pre-stressing torque corresponding to the foregoing conditions will be:

$$C_p = 250 \times 25 \times 0.01 = 62.5 \text{ N.m.}$$

This element will be accompanied by a curve (or a table) as shown in FIG. 29.

The user finds the clamping value $x^1$ to be exerted on the element to obtain the desired pre-stressing torque $C_p^1$, the torque $C_p$ being shown as ordinates and the clamping values $x$ as abscissae.

It will be clear that many tests will permit checking and correcting these values.

As concerns the advantages resulting from the invention, there may be mentioned:

(1) *Features of application.*—The strip and the coupling elements E . . . $E^5$ are products of low cost price, suitable for standardization, light and of small size.

The machining necessary for their use is very limited and of a particularly cheap type (generally lathe or automatic turning) and this machining is very suitable for mass-production.

The machining of the bearing surfaces, essential for centering and support, is sufficient so far as concerns shape and dimensions, without the slightest turning or grinding being necessary.

The housing for the element E . . . E⁵ can be provided, as desired, in the hub or in the shaft but only one of these parts need be machined.

The precision of the machining is no higher than is usual in current mechanical engineering practice.

(2) *Mechanical properties.*—The coupling force between the two coupled members is distributed over each tooth 1, 1ᵃ . . . and this is advantageous for the conditions of operation of the shaft A and of the hub M owing to the good distribution of the force over the coupling surface of each member.

High forces are achieved by the anchoring and wedging of the teeth without need for an initial radial pressure.

The device is symmetrical, balanced and results in no out-of-balance of the assembly.

The orientation and the distribution of the teeth permit constructing symmetrical or asymmetrical assemblies.

When there are no axial forces or when the latter are low relative to the working torque, the device ensures that the elements stay in position in the axial direction without need for an additional attachment.

The assembly is achieved by a simple fitting operation with no need to employ unduly high forces, on condition that in the case of element E⁵ having two rows of projections this element be pre-stressed.

Disassembly is always possible irrespective of the contemplated arrangement and the various parts, including the coupling element can be employed again.

The disassembly force is of the same order as that required for assembly.

The resilience of the coupling element insures a continuous contact and the assembly is without play.

(3) *Electric properties.*—In the event of the utilization of a metal strip or a strip which has been rendered conductive, the penetration of the teeth in the material of the two members A and M permits an excellent electrical conductivity between one member and the other.

(4) *Standardization.*—For a given type of teeth, each unit surface of the strip is capable of transmitting a given shear stress.

Each type of teeth permits equipping any assembly, regardless of its dimensions, by the juxtaposition of a number of unit strips or by a strip made to the suitable width.

For each type of teeth, if the coupling surface is similar to that of a basic assembly, irrespective of the dimensions, the assembly would operate under conditions similar to those of the basic assembly (in particular, the stresses would be equal regardless of the dimensions of the assembly).

A relatively small number of types of teeth permits constructing several types of assemblies for all dimensions.

Consequently, the production and utilization are particularly economical and the required machines and tooling are small in number.

The coupling strip can be produced and commercialized either in the form of a continuous strip of variable length or as an element having a dimension corresponding to a given application.

It will be understood that the possible applications of the invention are very varied. There may be mentioned in particular:

In the automobile industry: for mounting various accessories such as, water pump pulleys, fan pulleys; dynamo pulleys; for keying, for example, the driving shaft of windshield wipers or window-raising cranks.

In the electrical household equipment industry: for mounting, for example, washing machine pulleys, fan pulleys, or vacuum cleaner pulleys.

In general mechanical engineering: for mounting, for example, transmission pulleys, flexible couplings, couplings, fixed gear or the drives of pumps; for fixing, for example, cams, levers, or rockers; for mounting, for example, centrifugal or fan pump rotors.

In the electrical constructions: fixing, for example, fan wheels on the shafts of motors.

Although specific embodiments of the invention have been described, many modifications and changes may be made therein without departing from the scope of the invention as defined in the appended claims.

The strip instead of being for example corrugated could be folded, the teeth or tabs being parallel to every other fold.

Having now described my invention what I claim as new and desire to secure by Letters Patent is:

1. Strip for coupling two members having concentric cylindrical surfaces, said strip being resiliently bendable and comprising two faces, a row of pairs of tab portions which extend transversely of the strip, apertures in the strip located between adjacent pairs of tab portions and partly defined by said adjacent pairs of tab portions, each pair of tab portions being substantially contained in an inclined plane intersecting the general plane of the strip, the tab portions of each pair of tab portions being symmetrical relative to the line of intersection of said general plane and said inclined plane and constituting two projections respectively projecting from said two faces of the strip, said projections having sharp edges for engaging said cylindrical surfaces and being resiliently yieldable upon application of force thereon in a direction perpendicular to said general plane.

2. Strip as claimed in claim 1, said inclined planes being tangent to the corrugations.

3. Strip as claimed in claim 1, comprising transverse folds, said inclined planes being parallel to the folds.

4. Strip for coupling two members having concentric cylindrical surfaces, said strip being resiliently bendable and having two faces and two adjacent longitudinally extending strip parts, each strip part comprising a row of pairs of tab portions which extend transversely of the strip, apertures in the strip located between adjacent pairs of tab portions and partly defined by said adjacent pairs of tab portions, each pair of tab portions being substantially contained in an inclined plane intersecting the general plane of the strip, the tab portions of each pair of tab portions being symmetrical relative to the line of intersection of said general plane and said inclined plane and constituting two projections respectively projecting from said two faces of the strip, said projections having sharp edges for engaging said cylindrical surfaces and being resiliently yieldable upon application of force thereon in a direction perpendicular to said general plane, said inclined planes of the tab portions of one strip part being inclined in the opposite direction to said inclined planes of the tab portions of the other strip part, and resiliently yieldable portions interconnecting said two parts of the strip, the resiliently yieldable portions being capable of undergoing a pre-stressing resilient deformation which tends to shift said parts of the strip relative to each other in the longitudinal direction of said parts.

5. Strip as claimed in claim 4, having a middle strip part and inclined slots in said middle strip part forming therebetween inclined strip portions which constitute said resiliently yieldable portions.

6. An element for coupling two members having concentric cylindrical surfaces by the interposition and engagement of the element between said surfaces, said element being in the form of a split ring consisting of a part-cylindrical resiliently bendable strip comprising an outer part-cylindrical face and an inner part-cylindrical face, a circumferentially extending row of pairs of tab portions which extend in a direction substantially parallel to the axis of said split ring, apertures in the strip located between adjacent pairs of tab portions and partly defined by said adjacent pairs of tab portions, each pair of tab portions being substantially contained in an inclined plane which intersects said inner and outer faces and intersects and is in incline drelation to a radial plane of said split ring, the tab portions of each pair of tab portions being symmetrical relative to the line of intersection of said inclined plane and said radial plane and constituting two projections respectively projecting equal distances from said inner and outer faces of the strip, said projections having sharp edges for engaging said cylindrical surfaces and being radially resiliently yieldable toward the face of said strip from which they project.

7. An element as claimed in claim 6, wherein said sharp edges are rectilinear and parallel to the axis of said split ring.

8. An element for coupling two members having concentric cylindrical surfaces by the interposition and engagement of the element between said surfaces, said element being in the form of a split ring consisting of a part-cylindrical resiliently bendable strip comprising an outer part-cylindrical face and an inner part-cylindrical face, two circumferentially extending strip parts, each strip part comprising a circumferentially extending row of pairs of tab portions which extend in a direction substantially parallel to the axis of said split ring, apertures in the strip located between adjacent pairs of tab portions and partly defined by said adjacent pairs of tab portions, each pair of tab portions being substantially contained in an inclined plane which intersects said inner and outer faces and intersects and is in inclined relation to a radial plane of said split ring, the tab portions of each pair of tab portions being symmetrical relative to the line of intersection of said inclined plane and said radial plane and constituting two projections respectively projecting equal distances from said inner and outer faces of the strip, said projections having sharp edges for engaging said cylindrical surfaces, and being radially resiliently yieldable toward the face of said strip from which they project, said inclined planes of said pairs of tab portions of one of said strip parts being inclined relative to radial planes of said split ring in the opposite direction to said inclined planes of said pairs of tab portions of the other strip part and a circumferentially extending row of resiliently yieldable portions interconnecting said two parts of the strip, the resiliently yieldable portions being capable of undergoing a pre-stressing resilient deformation which tends to shift said parts of the strip relative to each other in the circumferential direction of said parts.

9. An element as claimed in claim 8, wherein said resiliently yieldable portions are formed in a middle part of the strip and are constituted by tabs which are inclined relative to the axis of the part-cylindrical strip and are defined by inclined slots in said middle part.

10. Mechanical assembly comprising two members having coaxial cylindrical surfaces, and an element coupling said members by interposition between and engagement with said surfaces, said element being in the form of a split ring consisting of a part-cylindrical strip consisting of a resiliently bendable material and comprising an outer part-cylindrical face and an inner part-cylindrical face, a circumferentially extending row of pairs of tab portions which extend in a direction substantially parallel to the axis of said split ring, apertures in the strip located between adjacent pairs of tab portions and partly defined by said adjacent pairs of tab portions, each pair of tab portions being substantially contained in an inclined plane which intersects said inner and outer faces and interescts and is in inclined relation to a radial plane of said split ring, the tab portions of each pair of tab portions being symmetrical relative to the line of intersection of said inclined plane and said radial plane and constituting two projections respectively projecting equal distances from said inner and outer faces of the strip, said projections having sharp edges for engaging said cylindrical surfaces and being radially resiliently yieldable toward the face of said strip from which they project, said material of said strips having an elastic strength greater than that of said members.

11. Mechanical assembly comprising in combination, two coaxial members of which one is a driving member and the other a driven member, an element coupling said members by interposition between and engagement with said members, said element being in the form of a split ring consisting of a part-cylindrical strip consisting of a resiliently bendable material and having an outer part-cylindrical face and an inner part-cylindrical face and two circumferentially extending strip parts, each strip part comprising a circumferentially extending row of pairs of tab portions which extend in a direction substantially parallel to the axis of said split ring, apertures in the strip located between adjacent pairs of tab portions and partly defined by said adjacent pairs of tab portions, each pair of tab portions being substantially contained in an inclined plane which intersects said inner and outer faces and intersects and is in inclined relation to a radial plane of said split ring, the tab portions of each pair of tab portions being symmetrical relative to the line of intersection of said inclined plane and said radial plane and constituting two projections respectively projecting equal distances from said inner and outer faces of the strip, said projections having sharp edges for engaging said cylindrical surfaces and being radially resiliently yieldable toward the face of said strip from which they project, and a circumferentially extending row of resiliently yieldable portions interconnecting said two parts of the strip, the resiliently yieldable portions being capable of undergoing a pre-stressing resilient deformation which tends to shift said parts of the strip relative to each other in the circumferential direction of said parts, and a device operatively connected to said element for subjecting said resiliently yieldable portions to a force creating in said element a pre-stressing torque which tends to turn one of said two strip parts relative to the other of said two strip parts and which is at least equal to the maximum driving torque that said driving member is intended to receive in either direction of rotation.

12. Mechanical assembly as claimed in claim 11, wherein said resiliently yieldable portions are formed in a middle part of the strip and are constituted by portions which are inclined relative to radial planes of said split ring and are defined by inclined slots in said middle part.

13. Mechanical assembly as claimed in claim 11, wherein said device is of the screw-and-nut type.

14. Mechanical assembly as claimed in claim 11, wherein one end of said ring abuts against a shoulder on one of said members, whereas the other end of said ring is axially pressed toward said one end by a member mounted on said one of said members by screwthreaded means.

References Cited
UNITED STATES PATENTS

| | | | |
|---|---|---|---|
| 2,883,024 | 4/1959 | Emrick | 192—45.1 X |
| 2,910,159 | 10/1959 | Nielsen | 192—45.1 |
| 3,061,060 | 10/1962 | Stephenson | 192—45.1 X |
| 3,101,690 | 8/1963 | O'Day et al | 72—335 X |
| 3,202,251 | 8/1965 | Fulton | 192—45.1 |

DONLEY J. STOCKING, *Primary Examiner.*

ARTHUR T. McKEON, *Examiner.*